United States Patent
Tanaka et al.

(10) Patent No.: US 12,509,054 B2
(45) Date of Patent: Dec. 30, 2025

(54) VEHICLE, CONTROL METHOD FOR VEHICLE, AND VEHICLE CONTROL INTERFACE BOX

(71) Applicant: TOYOTA JIDOSHA KABUSHIKI KAISHA, Toyota (JP)

(72) Inventors: Go Tanaka, Toyota (JP); Ikuma Suzuki, Okazaki (JP); Haruki Oguri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 18/594,044

(22) Filed: Mar. 4, 2024

(65) Prior Publication Data

US 2024/0326773 A1    Oct. 3, 2024

(30) Foreign Application Priority Data

Mar. 27, 2023    (JP) .................................. 2023-050329

(51) Int. Cl.
| | |
|---|---|
| *B60W 10/18* | (2012.01) |
| *B60T 7/12* | (2006.01) |
| *B60W 30/18* | (2012.01) |
| *B60W 60/00* | (2020.01) |

(52) U.S. Cl.
CPC ............ *B60W 10/182* (2013.01); *B60T 7/12* (2013.01); *B60W 30/18027* (2013.01); *B60W 60/001* (2020.02); *B60T 2201/10* (2013.01)

(58) Field of Classification Search
CPC ......... B60W 10/182; B60W 30/18027; B60W 60/001; B60W 50/00; B60W 2050/0002; B60W 2710/186; B60T 7/12; B60T 2201/10
USPC .............................................. 701/70, 76, 79
See application file for complete search history.

(56) References Cited

U.S. PATENT DOCUMENTS

2019/0299927 A1    10/2019    Ando

FOREIGN PATENT DOCUMENTS

JP    2019-177808 A    10/2019

*Primary Examiner* — Hai H Huynh
(74) *Attorney, Agent, or Firm* — Oliff PLC

(57) ABSTRACT

A vehicle equipped with an autonomous driving system includes a vehicle platform configured to execute vehicle control in accordance with commands from the autonomous driving system. The vehicle platform includes a base vehicle including an electric parking brake, and a vehicle control interface box configured to perform interfacing between the autonomous driving system and the base vehicle. An immobility command including one of a first value requesting immobilization of the vehicle, a second value requesting release of the immobilization of the vehicle, and a third value that makes no request, is transmitted from the autonomous driving system to the vehicle control interface box. The vehicle platform is configured to release the electric parking brake when acceleration of the vehicle is requested, in a case where the immobility command including the third value is received and the electric parking brake is in an activated state.

6 Claims, 8 Drawing Sheets

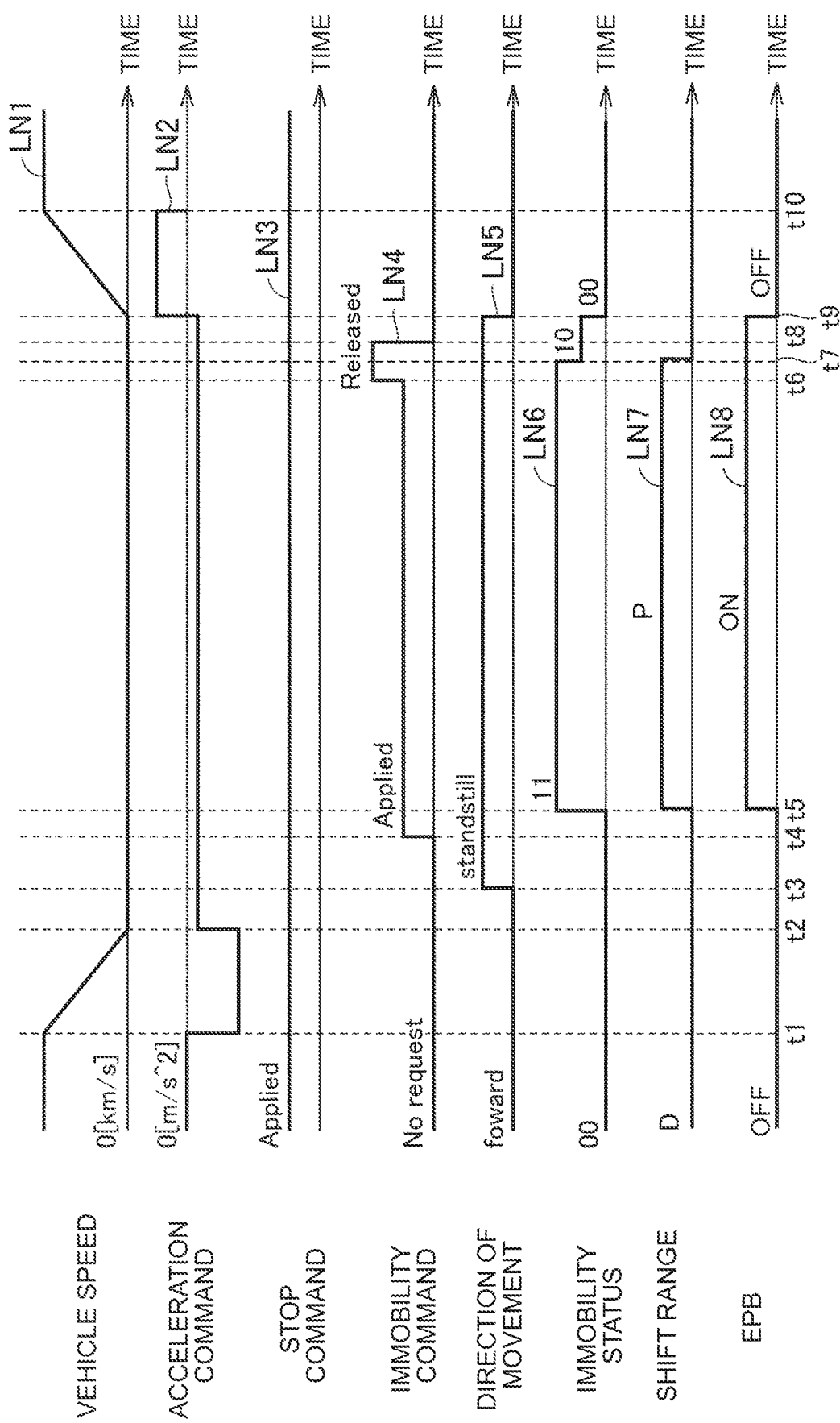

VEHICLE, CONTROL METHOD FOR VEHICLE, AND VEHICLE CONTROL INTERFACE BOX

CROSS-REFERENCE TO RELATED APPLICATION

This application claims priority to Japanese Patent Application No. 2023-050329 filed on Mar. 27, 2023 incorporated herein by reference in its entirety.

BACKGROUND

1. Technical Field

The present disclosure relates to a vehicle, a control method for vehicle, and a vehicle control interface box.

2. Description of Related Art

In recent years, progress has been made in development of autonomous driving systems in which vehicles travel without accepting operations from users. There are cases in which, for example, an autonomous driving system is provided separately from a vehicle, via an interface, so that installation thereof can be performed in an existing vehicle.

As such an autonomous driving system, for example, Japanese Unexamined Patent Application Publication No. 2019-177808 (JP 2019-177808 A) discloses technology in which independently providing an information processing device for autonomous driving, in addition to an electronic control unit (ECU) that manages power of the vehicle, enables autonomous driving functions to be added to existing vehicle platforms without involving major changes.

SUMMARY

Now, during autonomous driving of a vehicle, there are no user operations, and accordingly when the vehicle starts moving from a parking location, a parking brake, parking lock, or the like, that keep wheels thereof in a fixed state, need to be released at an appropriate timing.

The present disclosure provides a vehicle, a control method of the vehicle, and a vehicle control interface box, that can be equipped with an autonomous driving system, and that release fixation of wheel rotation at an appropriate timing during autonomous driving.

A vehicle according to an aspect of the present disclosure is a vehicle equipped with an autonomous driving system. The vehicle includes a vehicle platform configured to execute vehicle control in accordance with commands from the autonomous driving system. The vehicle platform includes a base vehicle including an electric parking brake, and a vehicle control interface box configured to perform interfacing between the autonomous driving system and the base vehicle. An immobility command including one of a first value requesting immobilization of the vehicle, a second value requesting release of immobilization of the vehicle, and a third value that makes no request, is transmitted from the autonomous driving system to the vehicle control interface box. The vehicle control interface box is configured to release the electric parking brake when acceleration of the vehicle is requested, in a case where the immobility command including the third value is received and the electric parking brake is in an activated state.

Thus, in a situation in which immobilization of the vehicle is not required, the activated state of the electric parking brake is maintained until acceleration of the vehicle is requested, and accordingly when the vehicle is parked on an uphill road or the like, unintended movement of the vehicle can be suppressed. Also, the electric parking brake is released when acceleration of the vehicle is requested, and accordingly the vehicle can promptly start to move.

In an embodiment, in addition to the immobility command, an acceleration command requesting acceleration of the vehicle may be further transmitted from the autonomous driving system to the vehicle control interface box. The vehicle platform may be configured to, in a case where the immobility command including the third value is received and the electric parking brake is in the activated state, release the electric parking brake in response to receiving the acceleration command.

Thus, the electric parking brake is released when the acceleration command is received, and accordingly the vehicle can promptly start to move.

In yet another embodiment, the vehicle platform may be configured to in a case the immobility command including the third value is received and the electric parking brake is in the activated state, to release the electric parking brake in response to accepting an acceleration operation.

Thus, the electric parking brake is released when the acceleration operation is accepted, and accordingly the vehicle can promptly start to move.

In yet another embodiment, the base vehicle may further include a parking lock device. The vehicle platform may be configured to, in response to receiving the immobility command including the first value, implement immobilization of the vehicle by placing the electric parking brake and the parking lock device in an activated state respectively. The vehicle platform may be configured to, in response to receiving the immobility command including the second value when immobilization of the vehicle is being implemented, release the activated state of the parking lock device.

Thus, by implementing immobilization of the vehicle, movement of the vehicle can be suppressed by the parking lock device and the electric parking brake. Also, when the parking lock device is released by receiving the immobility command including the second value while implementing immobilization of the vehicle, the activated state of the electric parking brake is maintained until acceleration of the vehicle is requested, and accordingly unintended movement of the vehicle can be suppressed.

A control method of a vehicle according to another aspect of the present disclosure is a control method of a vehicle that is equipped with an autonomous driving system. The vehicle includes a vehicle platform configured to execute vehicle control in accordance with commands from the autonomous driving system. The vehicle platform includes a base vehicle including an electric parking brake, and a vehicle control interface box configured to perform interfacing between the autonomous driving system and the base vehicle. The control method includes transmitting, from the autonomous driving system to the vehicle control interface box, an immobility command including one of a first value requesting immobilization of the vehicle, a second value requesting release of immobilization of the vehicle, and a third value that makes no request; and in a case where the immobility command including the third value is received and the electric parking brake is in an activated state, releasing the electric parking brake when acceleration of the vehicle is requested.

A vehicle control interface box according to yet another aspect of the present disclosure is a vehicle control interface box that is configured to perform interfacing between an autonomous driving system and a vehicle that is configured to be equipped with the autonomous driving system and that includes a vehicle platform configured to execute vehicle control in accordance with commands from the autonomous driving system. The vehicle platform includes a base vehicle that includes an electric parking brake. The vehicle control interface box is configured to receive, from the autonomous driving system, an immobility command including one of a first value requesting immobilization of the vehicle, a second value requesting release of immobilization of the vehicle, and a third value that makes no request. The vehicle control interface box is configured to, in a case where the immobility command including the third value is received and the electric parking brake is in an activated state, release the electric parking brake when acceleration of the vehicle is requested.

Thus, the present disclosure can provide a vehicle, a control method of the vehicle, and a vehicle control interface box, that can be equipped with an autonomous driving system, and that release fixation of wheel rotation at an appropriate timing during autonomous driving.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a timing chart for describing operations of the ADS and the VP.

DETAILED DESCRIPTION OF EMBODIMENTS

An embodiment of the present disclosure will be described in detail below with reference to the drawings. Note that the same or corresponding portions are denoted by the same signs throughout the drawings, and description thereof will not be repeated.

Figure 1:
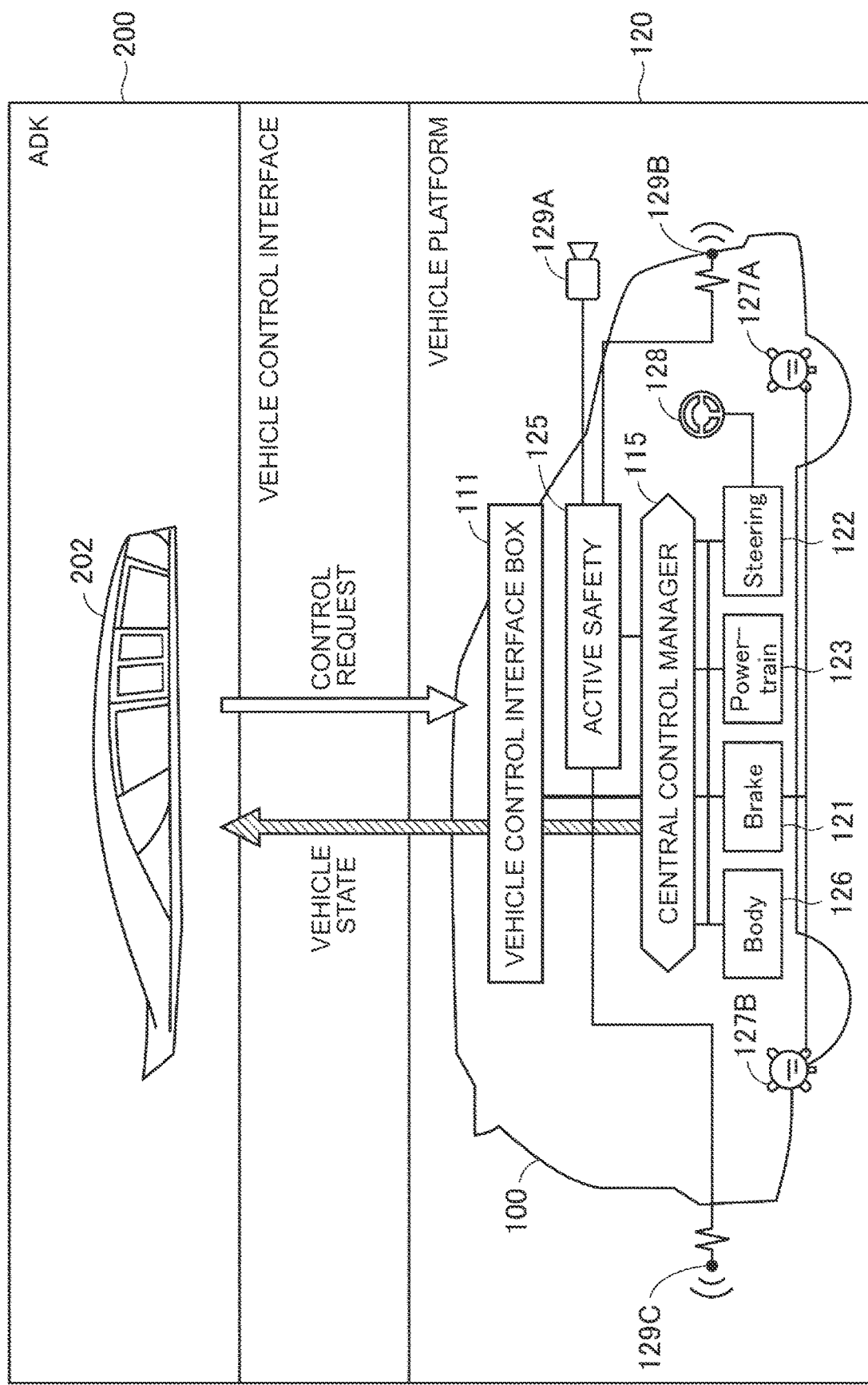
FIG. 1 is a diagram illustrating an overview of a vehicle according to an embodiment of the present disclosure.

FIG. 1 diagram illustrating an overview of a vehicle 10 according to the embodiment of the present disclosure. With reference to FIG. 1, the vehicle 10 includes an autonomous driving kit (hereinafter referred to as "ADK") 200, and a vehicle platform (hereinafter referred to as "VP") 120. The ADK 200 and the VP 120 are configured so as to be capable of communicating with each other via a vehicle control interface.

The vehicle 10 is capable of performing autonomous driving according to control requests (commands) from the ADK 200 attached to the VP 120. Note that while the VP 120 and the ADK 200 are illustrated in separate positions in FIG. 1, the ADK 200 is actually attached to a rooftop or the like of a base vehicle 100, which will be described later. Note that the ADK 200 is removable from the VP 120. When the ADK 200 is removed, the VP 120 can be made to travel by a user driving. In this case, the VP 120 executes traveling control in manual mode (traveling control in accordance with user operations).

The ADK 200 includes an autonomous driving system (hereinafter referred to as "ADS") 202 for performing autonomous driving of the vehicle 10. For example, the ADS 202 creates a traveling plan for the vehicle 10 and outputs various types of commands (control requests), for causing the vehicle 10 to travel according to the traveling plan that is created, to the VP 120 according to an application program interface (API) defined for each command. Also, the ADS 202 receives various types of signals indicating a state of the VP 120 (vehicle state) from the VP 120, in accordance with APIs defined for the signals, and reflects the vehicle state that is received in the creation of the traveling plan. A detailed configuration of the ADS 202 will be described later.

The VP 120 includes the base vehicle 100, and a vehicle control interface box (hereinafter referred to as "VCIB") 111 that realizes a vehicle control interface provided in the base vehicle 100.

The VCIB 111 is capable of communication with the ADK 200 through a controller area network (CAN) or the like. The VCIB 111 receives various types of commands from the ADK 200, and also outputs the state of the VP 120 to the ADK 200, by executing a predetermined API defined for each signal to be communicated. That is to say, in response to receiving a control request from the ADK 200, the VCIB 111 outputs a control command corresponding to the control request to the system that corresponds to the control command, via a central control manager 115. The VCIB 111 also acquires various types of information regrading the base vehicle 100 from various types of systems, via the central control manager 115, and outputs the state of the base vehicle 100 to the ADK 200 as a vehicle state.

The VP 120 includes various types of systems and various types of sensors for controlling the base vehicle 100. Autonomous driving of the vehicle 10 is performed by the VP 120 executing various types of vehicle control in accordance with control requests from the ADK 200 (more specifically, the ADS 202). The VP 120 includes, for example, a brake system 121, a steering system 122, a power-train system 123, an active safety system 125, and a body system 126.

The brake system 121 is configured to be capable of controlling a plurality of braking devices provided to the wheels of the base vehicle 100. Braking devices include, for example, disc brake systems that operate under hydraulic pressure regulated by actuators.

Wheel speed sensors 127A and 127B, for example, are connected to the brake system 121. The wheel speed sensor 127A is provided at a front wheel of the base vehicle 100, for example, to detect rotational speed of the front wheels. The wheel speed sensor 127A outputs the rotational speed of the front wheels to the brake system 121. The wheel speed sensor 127B is provided at a rear wheel of the base vehicle 100, for example, to detect rotational speed of the rear wheels. The wheel speed sensor 127B outputs the rotational speed of the rear wheels to the brake system 121. The wheel speed sensors 127A and 127B output pulse signals as output values (pulse values). The rotational speed can be calculated using the number of pulses of the pulse signals. The brake system 121 outputs the rotational speed of each wheel to the VCIB 111 as one piece of information included in the vehicle state.

The brake system 121 generates braking commands for the braking devices in accordance with a predetermined control request output from the ADK 200 via the VCIB 111 and the central control manager 115, and controls the braking devices using the braking commands that are generated.

The steering system 122 is configured to be capable of controlling a steering angle of steered wheels of the vehicle 10 using a steering device. The steering device includes, for example, a rack-and-pinion type electric power steering (EPS) device of which the steering angle can be adjusted by an actuator.

A pinion angle sensor 128 is connected to the steering system 122. The pinion angle sensor 128 detects a rotational angle (pinion angle) of a pinion gear coupled to a rotating shaft of an actuator making up the steering device. The pinion angle sensor 128 outputs the pinion angle that is detected to the steering system 122. The steering system 122 outputs the pinion angle to the VCIB 111 as one piece of information included in the vehicle state.

The steering system 122 generates a steering command for the steering device, in accordance with a predetermined control request output from the ADK 200 via the VCIB 111 and the central control manager 115. The steering system 122 controls the steering device using the steering command that is generated.

The power-train system 123 controls electric parking brakes (EPB) provided on at least one of a plurality of the wheels provided to the vehicle 10, a parking lock (hereinafter referred to as "P lock") provided on the transmission of the vehicle 10, and a shift device configured to be capable of selecting one out of a plurality of shift ranges, and a drive source of the vehicle 10. A detailed description will be given later.

The active safety system 125 uses a camera 129A and radar sensors 129B and 129C to detect forward or rearward obstructions or the like (obstructions or people), and when determination is made that there is a possibility of a collision occurring, from distance to the obstruction or the like and direction of movement of the vehicle 10, a braking command is output to the brake system 121 via the central control manager 115 to increase braking force.

The body system 126 is configured to be capable of controlling components such as turn direction indicator lights, a horn, windshield wipers, and so forth, depending on a traveling state, traveling environment, or the like, of the vehicle 10, for example. The body system 126 controls the above parts in accordance with a predetermined control request output from the ADK 200 via the VCIB 111 and the central control manager 115.

Note that vehicle 10 can be adopted as one component of a Mobility as a Service (MaaS) system. In addition to the vehicle 10, the MaaS system further includes, for example, a data server, a mobility service platform (hereinafter referred to as "mobility service platform (MSPF)"), and autonomous driving related mobility services (all omitted from illustration).

The vehicle 10 further includes a data communication module (DCM, omitted from illustration) serving as a communication interface for wirelessly communicating with the data server described above. The DCM outputs, for example, various types of vehicle information such as speed, position, and autonomous driving state, to the data server. Also, the DCM receives, for example, various types of data for managing the traveling of autonomous driving vehicles including the vehicle 10, in autonomous driving related mobility services, from the mobility service through the MSPF and the data server.

The MSPF is a unified platform to which various types of mobility services are connected. Connected to the MSPF are, in addition to the autonomous driving related mobility service, various types of mobility services that are omitted from illustration (e.g., various types of mobility services provided by ride-sharing businesses, car-sharing businesses, insurance companies, car-rental businesses, taxi companies, and so forth). Various types of mobility services can utilize various types of functions provided by the MSPF according to the service contents, using APIs published on the MSPF.

The autonomous driving related mobility service provides the mobility service using autonomous driving vehicles including the vehicle 10. The mobility service can obtain, for example, driving control data of the vehicle 10 communicating with the data server, information stored in the data server, and so forth, from the MSPF, using the APIs published on the MSPF. Also, the mobility service uses the above APIs to transmit, for example, data for managing autonomous driving vehicles including the vehicle 10, and so forth, to the MSPF.

Note that the MSPF has published APIs for using various types of data for vehicle state and vehicle control, necessary for developing ADSs, and ADS operators can use the data for vehicle state and vehicle control necessary for developing ADSs, which is stored in the data server, as the above APIs.

Figure 2:
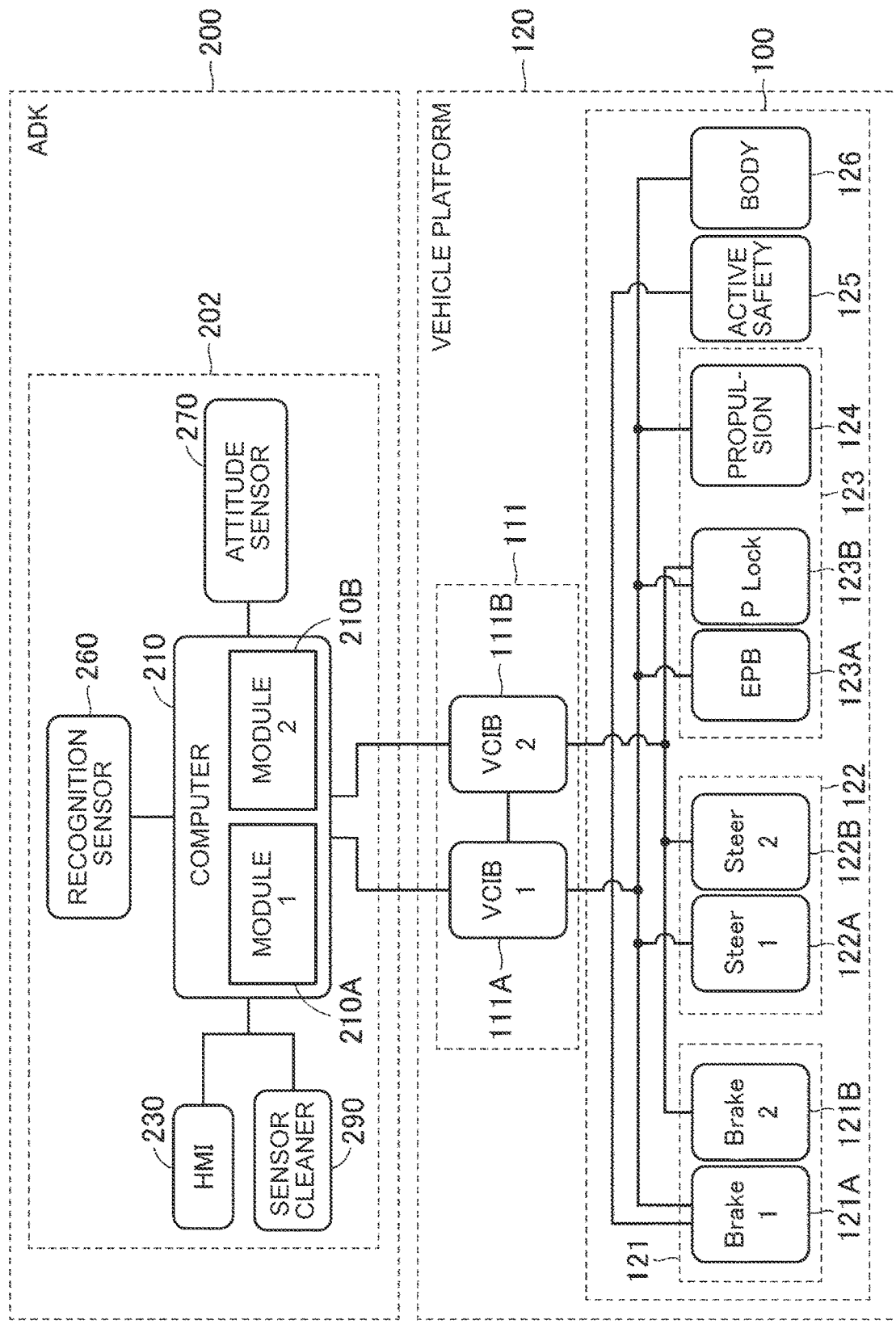
FIG. 2 is a diagram for describing, in detail, the configurations of an autonomous driving system (ADS), a vehicle control interface box (VCIB), and a vehicle platform (VP)

FIG. 2 is a diagram for describing, in detail, the configurations of the ADS 202, the VCIB 111, and the VP 120. As illustrated in FIG. 2, the ADS 202 includes a computer 210, a human-machine interface (HMI) 230, a recognition sensor 260, an attitude sensor 270, and a sensor cleaner 290.

During autonomous driving of the vehicle, the computer 210 acquires the environment around the vehicle, and attitude, behavior, and position of the vehicle, using various types of sensors which will be described later, and also acquires the vehicle state from the VP 120 which will be described later, via the VCIB 111, and sets the following operations of the vehicle 10 (acceleration, deceleration, turning, etc.). The computer 210 outputs various types of commands to the VCIB 111 to realize the next operation set for the vehicle. The computer 210 includes communication modules 210A and 210B. Each of the communication modules 210A and 210B is configured to be capable of communicating with the VCIB 111.

The HMI 230 presents information to the user and accepts operations during autonomous driving, during driving that requires user operations, when transitioning between autonomous driving and driving that requires user operations, or the like. The HMI 230 is configured to be connectable to, for example, input/output devices such as a touch panel display, a display device, an operating device, and so forth, which are provided in the base vehicle 100.

The recognition sensor 260 includes a sensor for recognizing the environment around the vehicle 10, and is made up of, for example, at least one of a LIDAR (an acronym for Laser Imaging Detection and Ranging) device, a millimeter wave radar device, and a camera.

A LIDAR device is a distance measuring device that measures distance by emitting pulsed laser light (infrared rays) and measuring the amount of time for the light to reflect off an object and return. A millimeter wave radar device is a distance measuring device that emits radio waves with a short wavelength toward an object, and measures distance and direction to the object by detecting the radio waves returned from the object. The camera is disposed, for example, on a rear side of a rearview mirror inside a vehicle cabin, and is used to shoot images forward of the vehicle. Information acquired by the recognition sensor 260 is output to the computer 210. Other vehicles, obstructions, and people ahead of the vehicle can be recognized by performing image processing on images and videos shot by the camera, using artificial intelligence (AI) or an image processing processor.

The attitude sensor 270 includes a sensor that detects the attitude, behavior, or position of the vehicle, and is made up of, for example, an inertial measurement unit (IMU), a Global Positioning System (GPS) device, and so forth.

An IMU detects, for example, acceleration of the vehicle in a front-rear direction, a right-left direction, and an up-down direction, and angular velocity of the vehicle in a roll direction, a pitch direction, and a yaw direction. A GPS device detects the position of the vehicle 10, using information received from a plurality of GPS satellites orbiting the earth. Information acquired by the attitude sensor 270 is output to the computer 210.

The sensor cleaner 290 is configured to remove foreign matter that adheres to the sensors while the vehicle is traveling. The sensor cleaner 290 removes foreign matter from, for example, lenses of cameras, emission units of laser or radio wave devices, and so forth, using cleaning liquid, wipers, and so forth.

The VCIB 111 includes a VCIB 111A and a VCIB 111B. The VCIB 111A and the VCIB 111B each has a central processing unit (CPU) and memory (including, e.g., read only memory (ROM), random access memory (RAM), and so forth), omitted from illustration, built therein. The VCIB 111A has the same functions as the VCIB 111B in comparison therewith, but there are some differences regarding to which systems connections are made, out of a plurality of systems that make up the VP 120.

The VCIB 111A and the VCIB 111B are respectively connected to the communication module 210A and the communication module 210B of the computer 210, so as to be capable of communication therewith. Further, the VCIB 111A and the VCIB 111B are connected so as to be capable of communication with each other.

Each of the VCIB 111A and the VCIB 111B relays various types of commands corresponding to control requests from the ADS 202 and performs output thereof as control commands to corresponding systems of the VP 120. More specifically, each of the VCIB 111A and the VCIB 111B is used to generate control commands used for controlling corresponding systems of the VP 120 using various types of commands output from the ADS 202, using information such as programs or the like stored in memory (e.g., APIs), and outputs the control commands that are generated to corresponding systems. Also, each of the VCIB 111A and the VCIB 111B relays vehicle information output from each system of the VP 120 and performs output thereof to the ADS 202 as the vehicle state. Note that the information indicating the vehicle state may be the same information as the vehicle information, or may be information that is extracted from the vehicle information for use in processing executed by the ADS 202.

By providing the VCIB 111A and the VCIB 111B that have equivalent functions regarding the operations of some systems (e.g., brakes and steering), the control system between the ADS 202 and the VP 120 is made to be redundant. Accordingly, when some sort of failure occurs in part of the systems, the functions of the VP 120 (turning, stopping, and so forth) can be maintained by switching control systems as appropriate, or cutting off the control system in which the failure has occurred.

The brake system 121 includes brake systems 121A and 121B. The steering system 122 includes steering systems 122A and 122B. The power-train system 123 includes an EPB system 123A, a P lock system 123B, and a propulsion system 124.

The VCIB 111A, and the brake system 121A, the steering system 122A, the EPB system 123A, the P lock system 123B, the propulsion system 124, and the body system 126, of the systems of the VP 120, are connected via a communication bus so as to be capable of communication with each other.

Further, the VCIB 111B, and the brake system 121B, the steering system 122B, and the P lock system 123B, of the systems of the VP 120, are connected to be capable of communicating with each other via a communication bus.

The brake systems 121A and 121B are each configured to be capable of controlling the braking devices provided to the wheels of the vehicle. The brake system 121A may have the same functions as the brake system 121B, or alternatively, for example, one of the brake systems may be configured to be capable of independently controlling the braking force of each wheel when the vehicle is traveling, and the other may be configured to be capable of controlling such that the same braking force is generated at each wheel when the vehicle is traveling.

The brake systems 121A and 121B generate braking commands for the braking devices in accordance with control requests output from the ADS 202 via the VCIB 111A and the VCIB 111B, respectively. Also, the brake systems 121A and 121B control the braking devices using braking commands generated in one of the brake systems for example, and when an abnormality occurs in one of the brake systems, control the braking devices using the braking commands generated in the other of the brake systems.

The steering systems 122A and 122B are each configured to be capable of controlling the steering angle of the steered wheels of the vehicle 10 using the steering device. The steering system 122A has similar functions in comparison with the steering system 122B.

The steering systems 122A and 122B generate steering commands for the steering device in accordance with control requests output from the ADS 202 via the VCIB 111A and the VCIB 111B, respectively. Further, the steering systems 122A and 122B control the steering device using steering commands generated in one of the steering systems for example, and when an abnormality occurs in one of the steering systems, control the steering device using the steering commands generated in the other of the steering systems.

The EPB system 123A is configured to be capable of controlling the EPB. The EPB fixes the wheels through operations of actuators. For example, the EPB uses actuators to activate drum brakes for parking brakes provided on part of the wheels provided to the vehicle 10 so as to fix the wheels, or to activate the braking devices using actuators that are capable of regulating hydraulic pressure supplied to the braking devices, separately from the brake systems 121A and 121B, so as to fix the wheels.

The EPB system 123A controls the EPB in accordance with control requests output from the ADS 202 via the VCIB 111A.

The P lock system 123B is configured to be capable of controlling a P lock device. In the P lock device, a protrusion provided at a distal end of a parking lock pole, of which the position is adjusted by an actuator is fitted as to teeth of a gear (lock gear) that is provided coupled to a rotating element within the transmission of the vehicle 10. As a result, rotation of an output shaft of the transmission is fixed, and the rotation of the wheels of drive wheels is fixed (hereinafter also referred to as "wheel fixation").

The P lock system 123B controls the P lock device in accordance with control requests output from the ADS 202 via the VCIB 111A. For example, the P lock system 123B activates the P lock device when the control request output from the ADS 202 via the VCIB 111A includes a control request to shift the shift range to a parking range (hereinafter referred to as "P range"), and releases the activation of the P lock device when the control request includes a control request to change the shift range to a position other than the P range.

The propulsion system 124 is configured to be capable of switching the shift range using the shift device, and to be capable of controlling the driving force of the vehicle 10 in the direction of movement of the vehicle 10 using the drive source. Shift ranges to which switching can be performed include, for example, the P range, a neutral range (hereinafter referred to as "N range"), forward drive range (hereinafter referred to as "D range"), and reverse range (hereinafter referred to as "R range"). The drive source includes, for example, a motor generator, an engine, or the like.

The propulsion system 124 controls the shift device and the drive source in accordance with a control requests output from the ADS 202 via the VCIB 111A. For example, when a control request output from the ADS 202 via the VCIB 111A includes a control request to change the shift range to the P range, the propulsion system 124 controls the shift device so that the shift range is changed to the P range.

The active safety system 125 is connected to the brake system 121A so as to be capable of communication therewith. As described above, the active safety system 125 uses the camera 129A and the radar sensor 129B to detect obstructions or the like (obstructions or people) ahead, and when determining that there is a possibility of a collision, based on the distance to the obstruction or the like, outputs a braking command to the brake system 121A to increase the braking force.

The body system 126 controls components such as the turn direction indicator lights, the horn, the windshield wipers, and so forth, in accordance with control requests output from the ADS 202 via the VCIB 111A.

Note that an operating device that can be manually operated by the user may be separately provided for the braking device, the steering device, the EPB, the P lock device, the shift device, the drive source, and so forth, that are described above.

The various types of commands corresponding to the control requests output from the ADS 202 to the VCIB 111 include a propulsion direction command that requests switching of the shift range, an immobility command that requests activation or release of activation of the EPB or the P lock device, an acceleration command that requests acceleration or deceleration of the vehicle 10, a tire turning angle command that requests a tire turning angle of the steered wheels, an immobility command that requests switching an automated status between states of an automated mode and a manual mode, and a stop command requesting stop-holding of the vehicle or releasing of the stop-holding.

In the vehicle 10 having the above configuration, when the automated mode is selected as the automated status by, for example, the user operating the HMI 230 or the like, autonomous driving is implemented. As described above, during autonomous driving, the ADS 202 first creates a traveling plan. The traveling plan includes a plurality of plans relating to operations of the vehicle 10, such as, for example, a plan to continue traveling straight, a plan to turn right or left at a predetermined intersection along a travel route that is set in advance, a plan to change lanes to a different lane from the lane in which the vehicle is currently traveling, and so forth.

The ADS 202 extracts controlling physical quantities (e.g., acceleration or deceleration, tire turning angle, and so forth) necessary for the vehicle 10 to operate according to the traveling plan that is created. The ADS 202 divides up the physical quantities for each API execution cycle. The ADS 202 executes APIs using the physical quantities that are divided up, and outputs various types of commands to the VCIB 111. Further, the ADS 202 acquires the vehicle state (e.g., the actual direction of movement of the vehicle 10, the fixation status of the vehicle, and so forth) from the VP 120, and recreates a traveling plan that reflects the vehicle status that is acquired. In this way, ADS 202 enables autonomous driving of the vehicle 10.

During autonomous driving of the vehicle 10, there are no user operations, and accordingly, in order for the vehicle 10 to start moving from a parking location, the EPB, the P lock device, or the like, that keep the wheels in a fixed state, need to be released at an appropriate timing.

Thus, in the present embodiment, it is assumed that the following operations are performed between the ADS 202 and the base vehicle 100 of the VP 120 via the VCIB 111. That is to say, the ADS 202 transmits the base vehicle an immobility command that contains one of a first value that requests immobilization of the vehicle 10 (wheel fixation), a second value that requests release of the immobilization of the vehicle 10, and a third value that makes no request, via the VCIB 111. In a case where the VP 120 receives the immobility command including the third value and the EPB is in an activated state, when acceleration of the vehicle 10 is requested, the VP 120 deactivates the EPB.

Thus, in a situation in which immobilization of the vehicle 10 is not required, the activated state of the EPB is maintained until acceleration of the vehicle 10 is requested, and accordingly when the vehicle 10 is parked on an uphill road or the like, unintended movement of the vehicle 10 can be suppressed. Also, the EPB is released when acceleration of the vehicle 10 is requested, the vehicle can promptly start to move.

Figure 3:
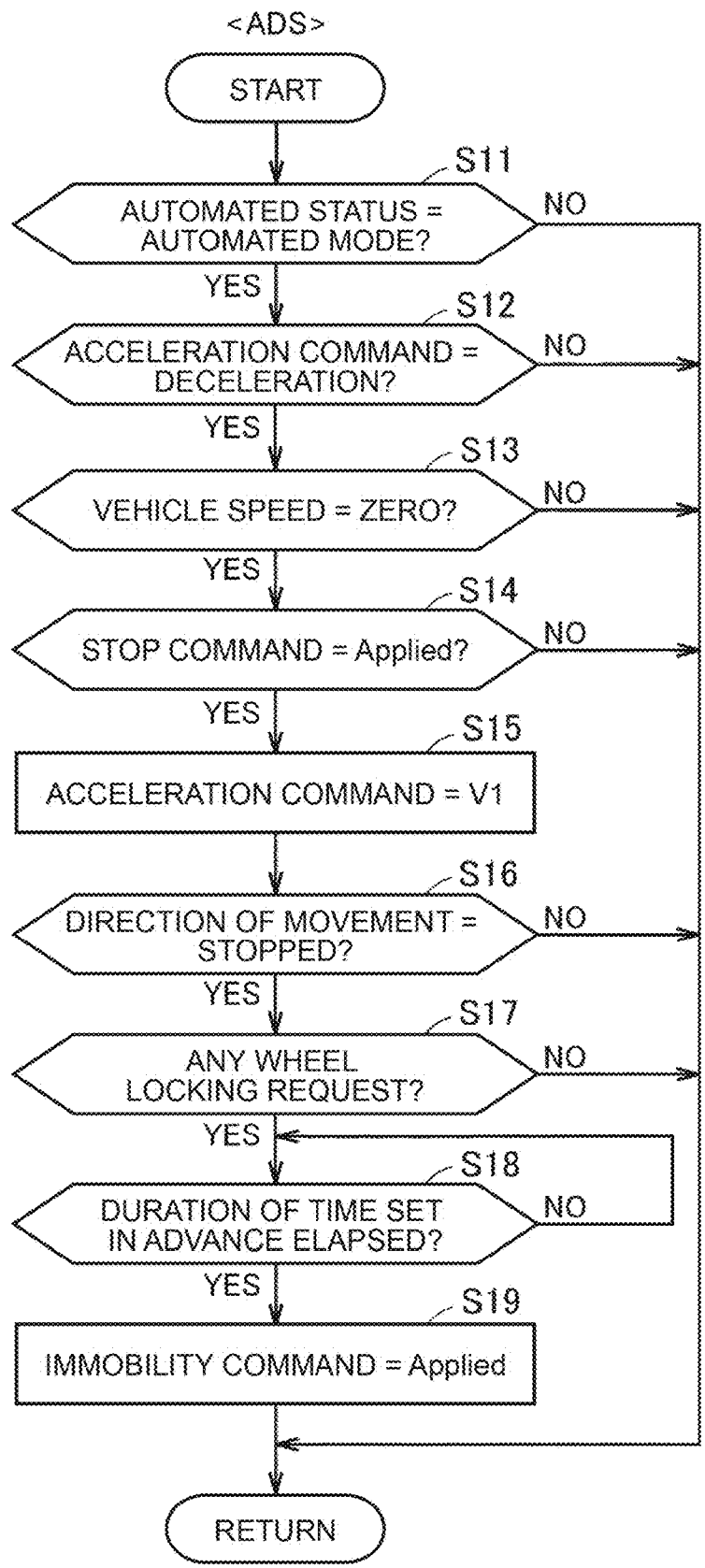
FIG. 3 is a flowchart showing an example of processing executed by the ADS.

Hereinafter, the processing executed by the ADS 202 (more specifically, the computer 210) according to the present embodiment will be described, with reference to FIG. 3. FIG. 3 is a flowchart showing an example of processing executed by the ADS 202. The ADS 202 repeatedly executes the following processing every API execution cycle, for example.

In step (hereinafter written as "S") 11, the ADS 202 determines whether the automated status is the automated mode. The ADS 202 determines whether the automated status is the automated mode, for example, based on the state of a flag indicating the automated mode. The flag indicating the automated mode is set to an on state, for example, when an operation for implementing autonomous driving, performed by the user at the HMI 230, is accepted, and is set to an off state when the automated mode is released and switched to manual mode, in accordance with user operations or the driving situation. When determination is made that the automated status is the automated mode (YES in S11), the processing transitions to S12.

In S12, the ADS 202 determines whether an acceleration command has a value indicating deceleration. The acceleration command indicates an acceleration value or a deceleration value. For example, when the acceleration command is a positive value, this indicates that the ADS 202 is requesting the VP 120 to accelerate the vehicle 10. Also, when the acceleration command is a negative value, this indicates that the ADS 202 is requesting the VP 120 to decelerate the vehicle 10. When the acceleration command has a negative value, the ADS 202 determines that the acceleration command is a value indicating deceleration (i.e., the acceleration command includes a deceleration value). When determination is made that the acceleration command has a value indicating deceleration (YES in S12), the processing transitions to S13.

In S13, the ADS 202 determines whether the vehicle speed is zero. The ADS 202 acquires information regarding the vehicle speed of the vehicle 10 from the VP 120, as the vehicle state. For example, information regarding the speed of the vehicle 10 (speed in traveling direction of the vehicle 10) calculated using wheel speed acquired by the wheel speed sensor 127A or the wheel speed sensor 127B of the base vehicle 100, as the vehicle state, is output from the base vehicle 100 to the ADS 202 via the VCIB 111. When determination is made that the vehicle speed is zero (YES in S13), the processing transitions to S14.

In S14, the ADS 202 determines whether the stop command is set to a value indicating "Applied". The stop command is used, for example, to select whether to apply a brake-hold function using the EPB, the P lock device, or the like, when the vehicle is stopped. When stop-holding of the vehicle 10 is requested, the stop command is set to a value indicating "Applied". Also, when a request is made to release the stop-holding of the vehicle 10, the stop command is set to a value indicating "Released". Note that when there is request for neither stop-holding nor releasing stop-holding of the vehicle 10, the stop command is set to a value indicating "No request". When determination is made that the stop command has a value indicating "Applied" (YES in S14), the processing transitions to S15.

In S15, the ADS 202 sets V1 as the acceleration command. V1 indicates a constant deceleration value. For example, V1 may be any value that can limit the movement of the vehicle 10, and may be a value set in advance, that is found to be suitable through experiments or the like.

In S16, the ADS 202 determines whether the direction of movement of the vehicle 10 indicates a stopped state. The ADS 202 acquires information regarding the direction of movement of the vehicle 10 from the VP 120, as the vehicle state. For example, when the speed of the vehicle 10 (speed in traveling direction of the vehicle 10) that is found using the wheel speed acquired by the wheel speed sensor 127A or the wheel speed sensor 127B of the base vehicle 100 continues to be in a state of zero for a predetermined duration of time, information indicating that the direction of movement of the vehicle is a stopped state is output from the base vehicle 100 to the ADS 202 via the VCIB 111, as the vehicle state. When determination is made that the direction of movement of the vehicle 10 indicates a stopped state (YES in S16), the processing transitions to S17.

In S17, the ADS 202 determines whether there is a wheel locking request. For example, the ADS 202 determines that there is a wheel locking request when the traveling plan that is created includes a plan to immobilize the vehicle 10. When determination is made that there is a wheel locking request (YES in S17), the processing transitions to S18.

In S18, the ADS 202 determines whether a duration of time that is set in advance has elapsed since the vehicle 10 stopped. For example, the ADS 202 may determine whether a duration of time that is set in advance has elapsed from a point in time at which the direction of movement of the vehicle 10 indicates a stopped state, or may determine whether a duration of time that is set in advance has elapsed from a point in time at which the vehicle speed became zero. The duration of time that is set in advance is found to be suitable by experimentation or the like, for example. When determination is made that the duration of time that is set in advance has elapsed from the vehicle 10 stopping (YES in S18), the processing transitions to S19.

In S19, the ADS 202 sets the immobility command to a value indicating "Applied". That is to say, the VP 120 is requested to immobilize the vehicle 10. To this end, when the immobility command is set to a value indicating "Applied", the EPB and the P lock device are controlled to be activated in the VP 120, which will be described later.

Note that when the automated status is not the automated mode (NO in S11), when the acceleration command is not a value that indicates a deceleration value (NO in S12), when the vehicle speed is not zero (NO in S13), when the stop command is a value that does not indicate "Applied" (NO in S14), when the direction of movement of the vehicle 10 does not indicate a stopped state (NO in S16), or when there is no wheel locking request (NO in S16), this processing is ended. Also, when the duration of time that is set in advance has not elapsed since the vehicle 10 stopped (NO in S18), the processing returns to S18.

Figure 4:
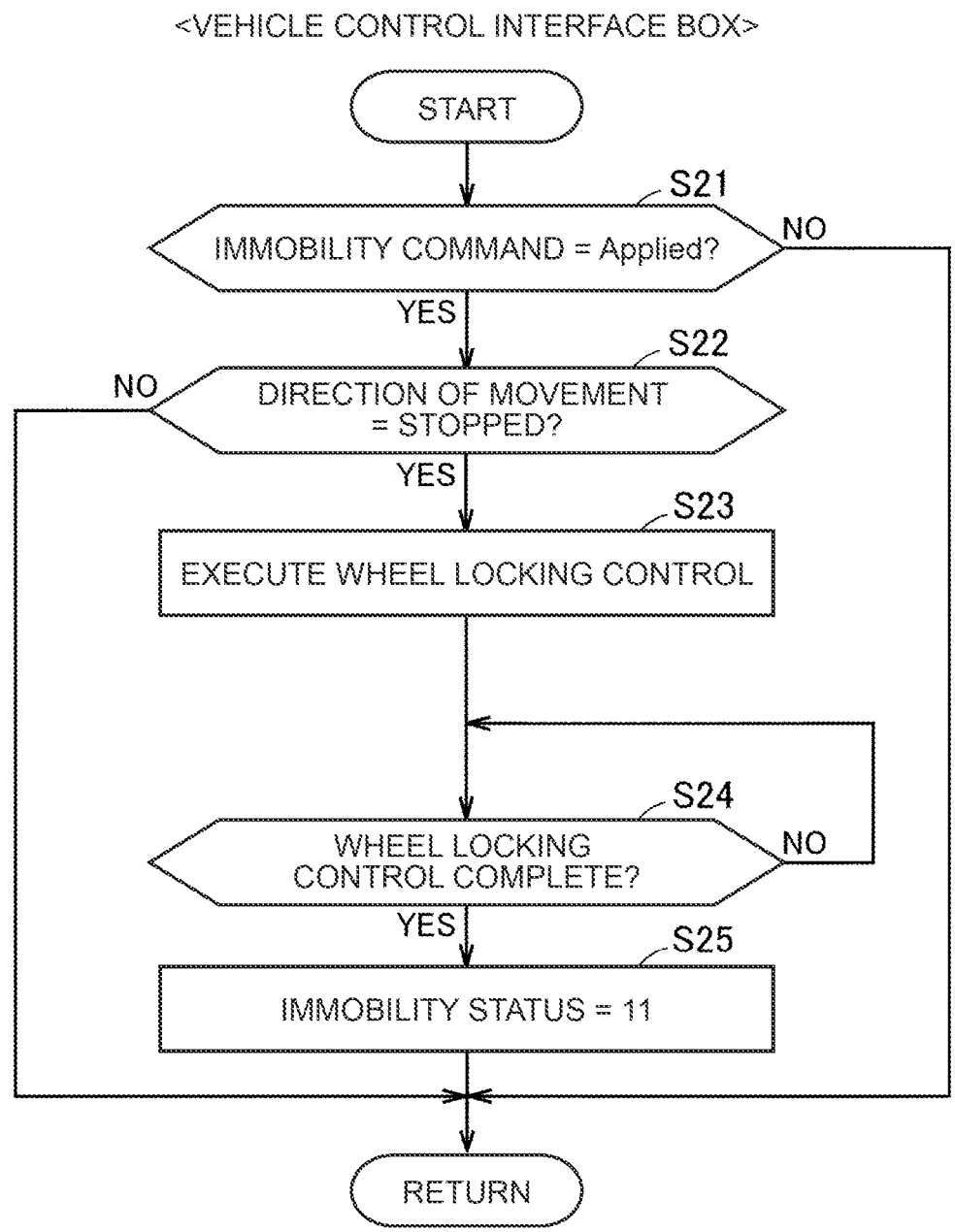
FIG. 4 is a flowchart showing an example of processing executed by the VCIB.

Next, with reference to FIG. 4, the processing executed by the VCIB 111 (more specifically, the VCIB 111A) will be described. FIG. 4 is a flowchart showing an example of processing executed by the VCIB 111. For example, the VCIB 111 repeatedly executes the following processing every API execution cycle.

In S21, the VCIB 111 determines whether the immobility command is set to a value indicating "Applied". When determination is made that the immobility command is set to a value indicating "Applied" (YES in S21), the processing transitions to S22.

In S22, the VCIB 111 determines whether the direction of movement of the vehicle 10 indicates a stopped state. When determination is made that the direction of movement of the vehicle 10 indicates a stopped state (YES in S22), the processing transitions to S23.

In S23, the VCIB 111 executes wheel locking control. Specifically, the VCIB 111 outputs a control command to the EPB system 123A requesting the EPB to be placed in an activated state, and also outputs a control command to the P lock system 123B requesting the P lock device to be placed in an activated state (control command requesting to shift the shift range to P range).

In S24, the VCIB 111 determines whether wheel locking control is completed. The VCIB 111 determines that wheel locking control is completed when both the EPB and the P lock device are in an activated state.

For example, the VCIB 111 may determine that the EPB is in the activated state when a predetermined duration of time has elapsed after outputting the control command requesting the EPB to be in the activated state, or the VCIB 111 may determine that the EPB is in the operating state when an amount of operation of an actuator of the EPB exceeds a threshold value.

Similarly, the VCIB 111 may, for example, determine that the P lock device is in the activated state when a predetermined duration of time has elapsed after outputting the control command requesting the P lock device to be in the activated state, or the VCIB 111 may determine that the P lock device is in the activated state when an activation amount of the actuator of the P lock device exceeds a threshold value. When determination is made that the wheel locking control is complete (YES in S24), the processing transitions to S25.

In S25, the VCIB 111 sets "11" as the immobility status. When the value indicating the immobility status is "11", this indicates that both the EPB and the P lock device are in activated states. The VCIB 111 outputs the immobility status that is set to the ADS 202 as one piece of information included in the vehicle state. Note that when determination is made that the direction of movement of the vehicle 10 does not indicate a stopped state (NO in S22), this processing is ended.

Also, when determination is made that the immobility command is not set to "Applied" (NO in S21), this processing ends. Further, when determination is made that the wheel locking control is not completed (NO in S24), the processing returns to S24.

Figure 5:
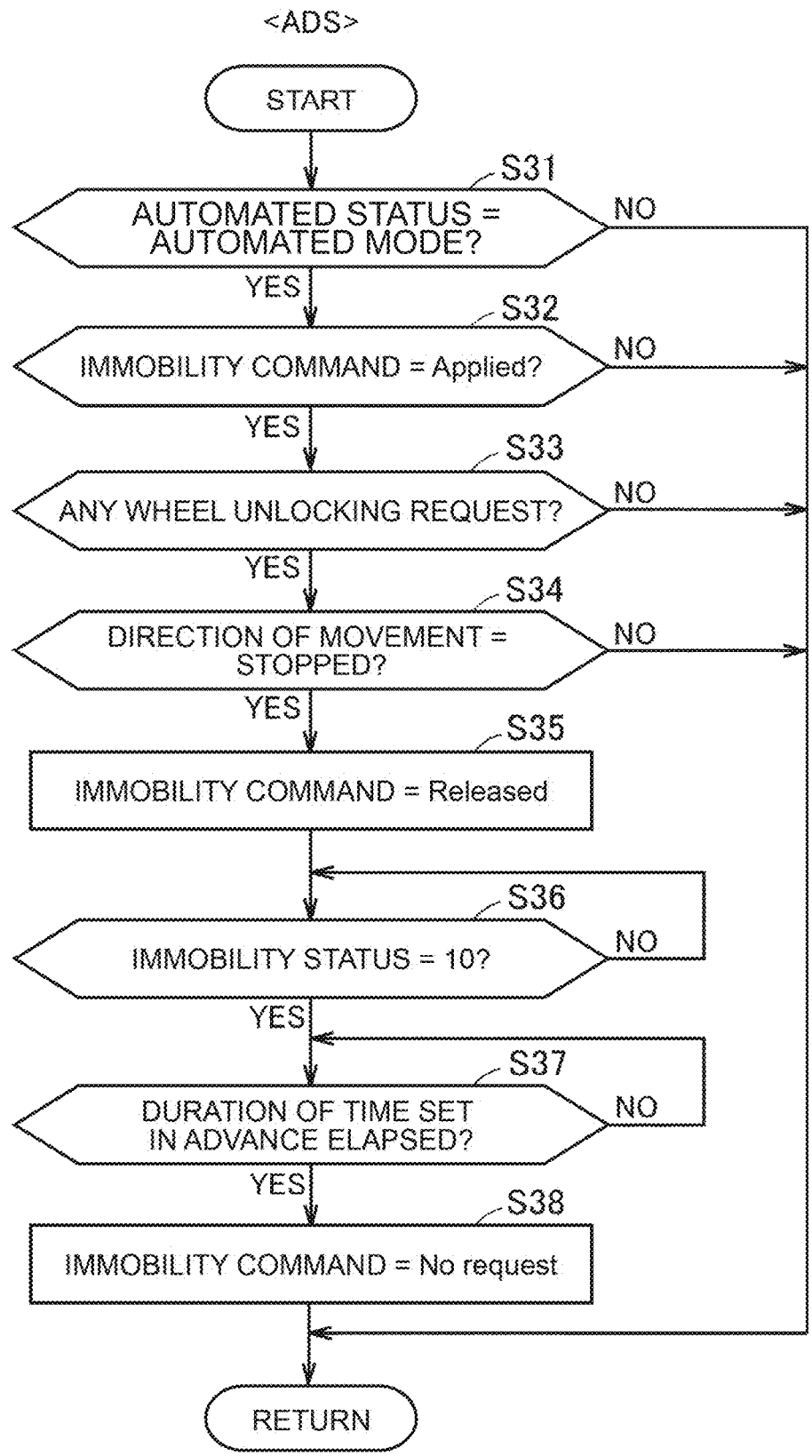
FIG. 5 is a flowchart showing an example of processing executed by the ADS when immobilization of the vehicle is requested.

Next, with reference to FIG. 5, description will be given regarding processing executed by the ADS 202 when immobilization of the vehicle 10 is requested. FIG. 5 is a flowchart showing an example of processing executed by the ADS 202 when immobilization of the vehicle 10 is requested. The ADS 202 repeatedly executes the following processing every API execution cycle, for example.

In S31, the ADS 202 determines whether the automated status is an automated mode. The method for determining whether the mode is the automated mode is the same as described above, and accordingly detailed description thereof will not be repeated. When determination is made that the automated status is the automated mode (YES in S31), the processing transitions to S32.

In S32, the ADS 202 determines whether the immobility command is set to a value indicating "Applied" (i.e., immobilization of the vehicle 10 is requested). When determination is made that the immobility command is set to a value indicating "Applied" (YES in S32), the processing transitions to S33.

In S33, the ADS 202 determines whether there is a wheel unlocking request. For example, the ADS 202 determines that there is a wheel unlocking request when the traveling plan that is created includes a plan to cause the vehicle to travel. When determination is made that there is a wheel unlocking request (YES in S33), the processing transitions to S34.

In S34, the ADS 202 determines whether the direction of movement of the vehicle 10 indicates a stopped state. The method for determining whether the direction of movement of the vehicle 10 indicates a stopped state is the same as described above, and accordingly detailed description thereof will not be repeated. When determination is made that the direction of movement of the vehicle 10 indicates a stopped state (YES in S34), the processing transitions to S35.

In S35, the ADS 202 sets the immobility command to a value indicating "Released". That is to say, the VP 120 is requested to release immobilization of the vehicle 10. When the immobility command is set to the value indicating "Released", the P lock device is controlled to be in an inactivated state, which will be described later.

In S36, the ADS 202 determines whether the immobility status is "10". The immobility status is output from the base vehicle 100 via the VCIB 111 as one piece of the vehicle state.

The immobility status is set by combining a value indicating the state of the EPB and a value indicating the state of the P lock device. When the value indicating the state of the EPB is "1", this indicates that the EPB is in an activated state. When the value indicating the state of the EPB is "0", this indicates that the EPB is in an inactivated state. Similarly, when the value indicating the state of the P lock device is "1", this indicates that the P lock device is in an activated state. When the value indicating the state of the P lock device is "0", this indicates that the P lock device is in an inactivated state. Accordingly, when the value indicating the immobility status is "11" for example, this indicates that both the EPB and the P lock device are in activated states. Also, when the value indicating the immobility status is "00", this indicates that both the EPB and the P lock device are in inactivated states. Further, when the value indicating the immobility status is "10", this indicates that the EPB is in the activated state and the P lock device is in the inactivated state. Further, when the value indicating the immobility status is "01", this indicates that the EPB is in the inactivated state and the P lock device is in the activated state. When determination is made that the immobility status is "10" (YES in S36), the processing transitions to S37.

In S37, the ADS 202 determines whether a duration of time that is set in advance has elapsed since the immobility status became "10". When determination is made that the duration of time that is set in advance has elapsed since the immobility status became "10" (YES in S37), the processing transitions to S38. Note that when determination is made that the duration of time that is set in advance has not elapsed since the immobility status became "10" (NO in S37), the processing returns to S37.

In S38, the ADS 202 sets the immobility command to a value indicating "No request". A value indicating "No request" in the immobility command indicates a state in which neither immobilization of the vehicle 10 nor release of immobilization is requested.

Note that when the automated status is not the automated mode (NO in S31), when the immobility command is not set to a value indicating "Applied" (NO in S32), when determination is made that there is no wheel unlocking request (NO in S33), or when determination is made that the direction of movement of the vehicle 10 is not a stopped state (NO in S34), this processing is ended. Also, when the immobility status is not set to "10" (NO in S36), the processing returns to S36.

Figure 6:
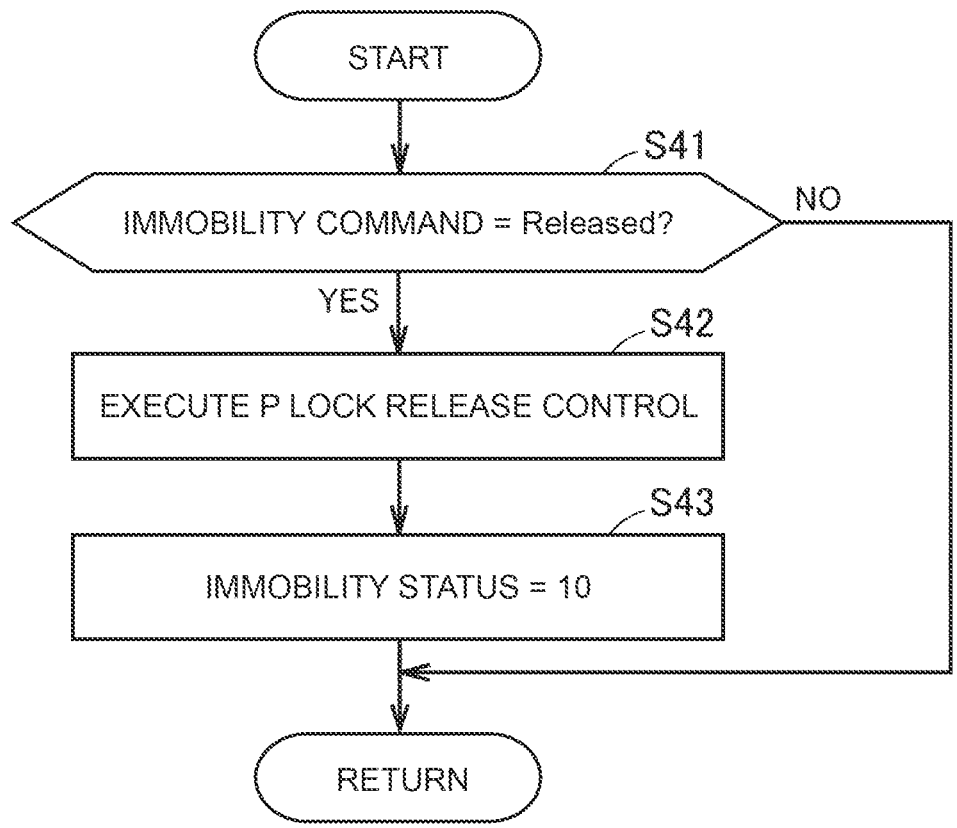
FIG. 6 is a flowchart showing an example of processing executed by the VCIB when releasing of immobilization of the vehicle is requested.

Next, with reference to FIG. 6, description will be given regarding processing that the VCIB 111 (more specifically, the VCIB 111A) executes when releasing of the immobilization of the vehicle 10 is requested. FIG. 6 is a flowchart showing an example of processing executed by the VCIB 111 when releasing of immobilization of the vehicle 10 is requested. For example, the VCIB 111 repeatedly executes the following processing every API execution cycle.

In S41, the VCIB 111 determines whether the immobility command is set to "Released". When determination is made that the immobility command is set to "Released" (YES in S41), the processing transitions to S42.

In S42, the VCIB 111 executes P lock release control. Specifically, the VCIB 111 outputs a control command to the P lock system 123B requesting that the P lock device be placed in the inactivated state (a control command requesting that, for example, the shift range is shifted to a non-P range (e.g., the N range, the D range, the R range, or the like)). Note that at this time, the VCIB 111 may output a control command to the EPB system 123A, requesting that the activated state of the EPB is maintained.

In S43, the VCIB 111 sets "10" as the immobility status. When the value indicating the immobility status is "10", this indicates that the P lock device is in the inactivated state. The VCIB 111 outputs the immobility status that is set to the ADS 202 as one piece of information included in the vehicle state.

Figure 7:
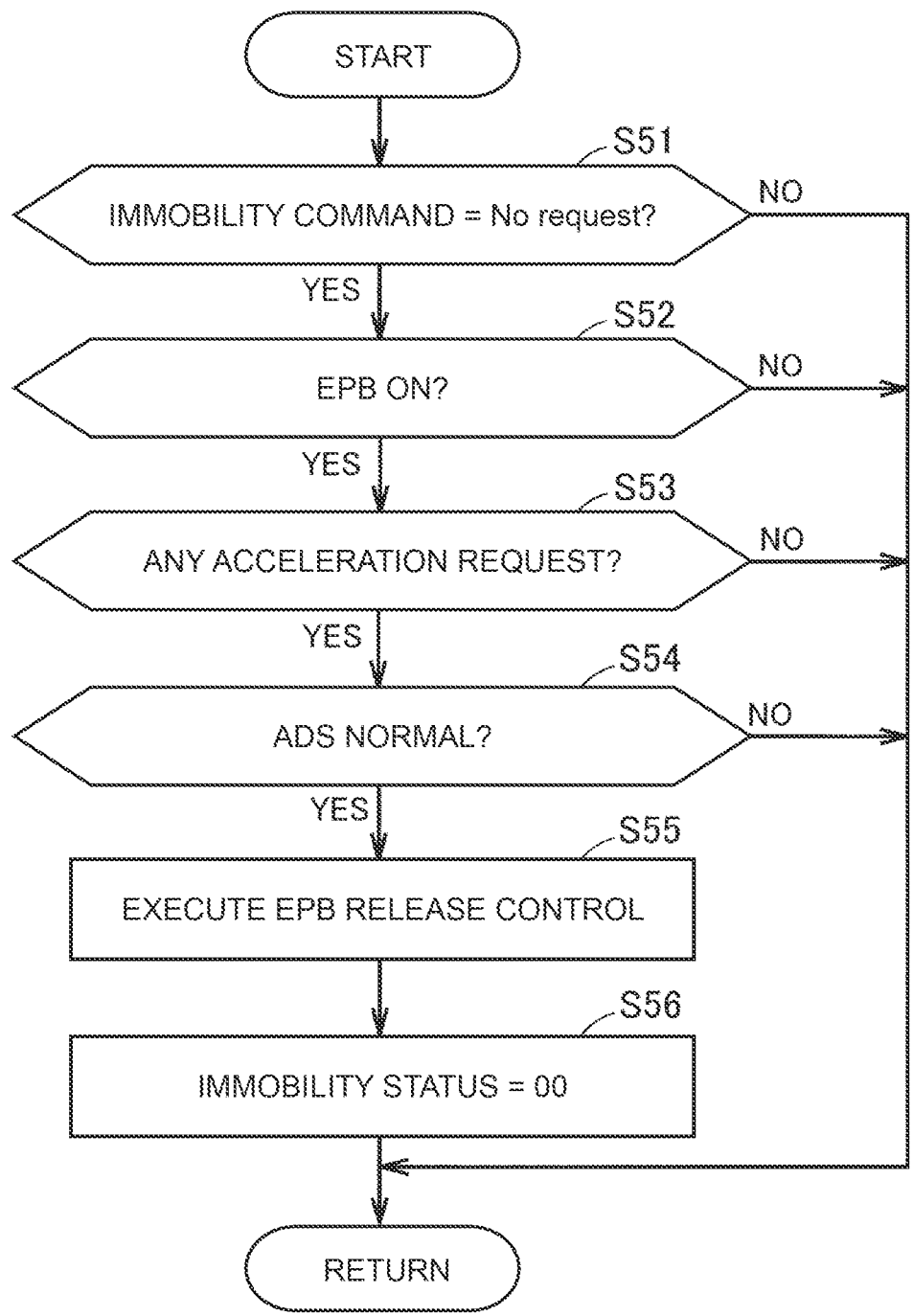
FIG. 7 is a flowchart showing an example of processing executed by the VCIB when a stopped vehicle starts moving.

Next, with reference to FIG. 7, processing executed by the VCIB 111 (more specifically, the VCIB 111A) when the vehicle 10 that is stopped starts moving will be described. FIG. 7 is a flowchart showing an example of processing executed by the VCIB 111 when the vehicle 10 that is stopped starts moving. For example, the VCIB 11 repeatedly executes the following processing every API execution cycle.

In S51, the VCIB 111 determines whether the immobility command is set to "No request". When determination is made that the immobility command is set to "No request" (YES in S51), the processing transitions to S52.

In S52, the VCIB 111 determines whether the EPB is in the on state (activated state). The method for determining whether the EPB is in the activated state is the same as described above, and accordingly detailed description thereof will not be repeated. When determination is made that the EPB is in the on state (YES in S52), the processing transitions to S53.

In S53, the VCIB 111 determines whether there is an acceleration request for the vehicle 10. For example, when the VCIB 111 receives an acceleration command from the ADS 202 and also the value indicating the acceleration command that is received is a positive value, the VCIB 111 determines that there is an acceleration request for the vehicle 10. Alternatively, the VCIB 111 determines that there is an acceleration request for the vehicle 10 when, for example, an acceleration operation is accepted, such as when an accelerator pedal is operated or the like. When determination is made that there is an acceleration request for the vehicle 10 (YES in S53), the processing transitions to S54.

In S54, the VCIB 111 determines whether the ADS 202 is in a normal state. For example, the VCIB 111 determines that the ADS 202 is in a normal state when information received from the ADS 202 includes information indicating that the ADS 202 is in a normal state. When determination is made that the ADS 202 is in a normal state (YES in S54), the processing transitions to S55.

In S55, the VCIB 111 executes EPB release control. Specifically, the VCIB 111 outputs a control command requesting the EPB system 123A to place the EPB in an inactivated state.

In S56, the VCIB 111 sets "00" as the immobility status. For example, the VCIB 111 may set the immobility status to "00" when a duration of time that is set in advance has elapsed after starting the EPB release control, or may set the immobility status to "00" when the operating state of the EPB is the inactivated state. Also, when the value indicating the immobility status is "00", this indicates that both the EPB and the P lock device are in the inactivated state. The VCIB 111 outputs the immobility status that is set to the ADS 202 as one piece of information included in the vehicle state.

The operations of the ADS 202 and the VCIB 111 based on the structures and the flowcharts such as those above will be described with reference to FIG. 8. FIG. 8 is a timing chart for describing operations of the ADS 202 and the VP 120. The horizontal axis in FIG. 8 represents time. LN1 in FIG. 8 represents change in the speed of the vehicle 10. LN2 in FIG. 8 represents change in the acceleration command. LN3 in FIG. 8 represents change in the stop command. LN4 in FIG. 8 represents change in the immobility command. LN5 in FIG. 8 represents change in the direction of movement of the vehicle 10. LN6 in FIG. 8 represents change in immobility status. LN7 in FIG. 8 represents change in the shift range (i.e., activation state of P lock device). LN8 in FIG. 8 represents change in the activation state of the EPB.

For example, assumption will be made that the vehicle 10 during autonomous driving is traveling at a constant speed, as indicated by LN1 in FIG. 8. At this time, as shown by LN2 in FIG. 8, the value indicating the acceleration command is assumed to be zero. Also, as shown by LN3 in FIG. 8, the stop command is assumed to be set to a value indicating "Applied". Further, as shown by LN4 in FIG. 8, the immobility command is assumed to be set to a value indicating "No request". Further, as shown by LN5 in FIG. 8, the direction of movement of the vehicle 10 is assumed to be a forward direction. Further, as shown by LN6 in FIG. 8, the immobility status is assumed to be "00". Further, as shown by LN7 in FIG. 8, the shift range is assumed to be the D range (the P lock device is in an inactivated state). Further, as shown by LN8 in FIG. 8, the EPB is assumed to be in an inactivated state.

At time t1, as shown by LN2 in FIG. 8, when the traveling plan created by the ADS 202 includes a deceleration plan, the acceleration command takes a value indicating deceleration in accordance with the traveling plan. Accordingly, as shown by LN1 in FIG. 8, the speed of the vehicle 10 decreases after time t1.

When the automated status is the automated mode (YES in S11) and the acceleration command is a value indicating deceleration (YES in S12), determination is made regarding whether the direction of movement of the vehicle 10 is a stopped state (S13).

At time t2, as shown by LN1 in FIG. 8, when the speed of the vehicle 10 becomes zero (YES in S13), the stop command has a value indicating "Applied" (YES in S14) as shown by LN3 of FIG. 8, and accordingly a constant deceleration value V1 is set as an acceleration command (S15) as shown in LN2 of FIG. 8.

When the state in which the speed of the vehicle 10 is zero continues for a predetermined duration of time, at time t3, as shown in LN5 in FIG. 8, the direction of movement of the vehicle 10 indicates a stopped state (YES in S16), and accordingly determination is made regarding whether a wheel locking request is made (S17). When there is a request for wheel locking (YES in S17), determination is made regarding whether a duration of time that is set in advance has elapsed since the vehicle 10 stopped (S18).

When determination is made at time t4 that the duration of time that is set in advance has elapsed since the vehicle 10 stopped (YES in S18), the immobility command is set to a value indicating "Applied" (S19), as shown by LN4 in FIG. 8.

When the immobility command is set to "Applied" (YES in S21) and the direction of movement of the vehicle 10 indicates a stopped state (YES in S22), wheel locking control is executed and immobilization of the vehicle 10 is implemented (S23). Thus, both the EPB and the P lock device of the base vehicle 100 are controlled to be in activated states. When wheel locking control is completed by both the EPB and the P lock device being placed in activated states (YES in S24), the immobility status is set to a value indicating "11" at time t5 (S25), as shown by LN6 in FIG. 8.

When the automated status is the automated mode (YES in S31) and the immobility command is set to "Applied"

(YES in S32) as shown by LN4 in FIG. 8, determination is made regarding whether a wheel unlocking request is made (S33).

When the traveling plan created by the ADS 202 includes a plan for releasing the immobilization of the vehicle 10, wheel unlocking is requested at time t6 in accordance with the traveling plan (YES in S33). Accordingly, as shown by LN5 in FIG. 8, the direction of movement of the vehicle 10 indicates a stopped state (YES in S34), and accordingly the immobility command is set to "Released" (S35), as shown by LN4 of FIG. 8.

When the immobility command is set to "Released" (YES in S41), P lock release control is executed (S42). Accordingly, the P lock device of the base vehicle 100 is controlled to be in the inactivated state, and also the immobility status is set to "10" at time t7 (S43), as shown by LN6 in FIG. 8. The immobility status that is set is transmitted to the ADS 202.

At time t7, when the ADS 202 determines that the immobility status is "10" (YES in S36), determination is made regarding whether a duration of time that is set in advance has elapsed since the immobility status was set to "10" (S37).

When determination is made at time t8 that the duration of time that is set in advance has elapsed since the immobility status was set to "10" (YES in S37), the immobility command is set to a value indicating "No request" (S38), as shown by LN4 in FIG. 8. The immobility command that is set is transmitted to the VCIB 111.

Further, as shown in LN4 of FIG. 8, when determination is made that the immobility command is set to "No request" (YES in S51), determination is made regarding whether the EPB is in an on state (S52). Even when determination is made that the EPB is in the on state (YES in S52), the on state of the EPB is maintained as long as the value indicating the acceleration command is a negative value (NO in S53).

On the other hand, at time t9, when the value indicating the acceleration command becomes a positive value, determination is made that there is an acceleration request (YES in S53), and when determination is made that the ADS 202 is normal (YES in S54), EPB release control is executed (S55). Accordingly, the EPB of the base vehicle 100 is controlled to be in the inactivated state, and also the immobility status is set to "00" at time t9 (S56), as shown by LN6 in FIG. 8. At time t10, when the value indicated by the acceleration command becomes zero, the vehicle speed is in a constant state after time t10.

Thus, according to the vehicle 10 of the present embodiment, in a situation in which immobilization of the vehicle 10 is not required, the activated state of the EPB is maintained until acceleration of the vehicle 10 is requested, and accordingly when the vehicle 10 is parked on an uphill road or the like, unintended movement of the vehicle 10 can be suppressed. Also, the EPB is released when acceleration of the vehicle 10 is requested, and accordingly the vehicle 10 can promptly start to move. Thus, a vehicle, a control method of the vehicle, and a vehicle control interface box, that can be equipped with an autonomous driving system, and that release fixation of wheel rotation at an appropriate timing during autonomous driving, can be provided.

Further, by implementing immobilization of the vehicle 10 when the vehicle 10 is stopped, movement of the vehicle 10 can be suppressed by the P lock device and the EPB. Also, when activation of the P lock device is released by receiving an immobility command including a value indicating "Released" while immobilization of the vehicle 10 is being implemented, the activated state of the EPB is maintained, and accordingly unintended movement of the vehicle 10 can be suppressed.

Modifications will be described below.

In the above embodiment, description has been made that the VCIB 111 executes the processing shown in the flowchart in FIG. 4, the processing shown in the flowchart in FIG. 6, and the processing shown in the flowchart in FIG. 7, but for example, the VCIB 111A and the VCIB 111B may cooperatively execute the above processing.

Further, in the above embodiment, description has been made that the VCIB 111 executes the processing shown in the flowchart of FIG. 4, the processing shown in the flowchart of FIG. 6, and the processing shown in the flowchart of FIG. 7, but for example, part or all of the above processing may be executed in each system in the base vehicle 100 that is the object of control (specifically, the EPB system 123A and the P lock system 123B).

Further, in the above-described embodiment, description has been made that the VCIB 111 executes wheel locking control (S23) when the immobility command has a value indicating "Applied" (YES in S21), and also the direction of movement of the vehicle 10 indicates a stopped state (YES in S22), but this command may be disregarded, for example, when the direction of movement of the vehicle 10 does not indicate a stopped state (NO in S22), even though the immobility command has a value indicating "Applied" (YES in S21). Specifically, the VCIB 111 may disregard the command by not executing wheel locking control, even though the immobility command is set to "Applied". At this time, the VCIB 111 may output information indicating that wheel locking control is not being executed to the ADS 202.

In this way, when a request to immobilize the vehicle 10 is made by an immobility command while the vehicle 10 is traveling, the request is disregarded, and accordingly immobilization of the vehicle 10 (i.e., wheel locking control) can be suppressed from being performed while the vehicle 10 is traveling.

Further, description has been made in the embodiment described above that when the ADS 202 determines that the duration of time set in advance has elapsed since the vehicle 10 stopped (YES in S16), the ADS 202 sets the immobility command to a value indicating "Applied", whereby wheel locking control is executed after the duration of time set in advance has elapsed after the vehicle 10 stops, but the acting entity that delays execution of wheel locking control is not limited to the ADS 202. For example, an arrangement may be made in which, when the direction of movement of the vehicle 10 is a stopped state, the ADS 202 sets the immobility command to a value indicating "Applied", and the VCIB 111 executes wheel locking control when the duration of time set in advance elapses from the point in time at which the immobility command is set to the value indicating "Applied". Thus, wheel locking control can be executed after the duration of time set in advance elapses after the vehicle 10 stops.

Further, description has been made in the embodiment described above that the P lock device is released when release of immobilization is requested in the stopped vehicle 10, but an arrangement may be made wherein, for example, when releasing of immobilization is requested (when "Released" is set as the immobility command), the P lock device is released when the request for the shift range of the vehicle 10 is the D range or the R range. Alternatively, the P lock device may be released when the direction that is requested as the direction of movement of the vehicle 10 is forward or reverse when release of immobilization is requested.

Note that all or part of the modifications described above may be combined as appropriate and implemented.

The embodiment disclosed herein should be considered to be exemplary in all respects and not restrictive. The scope of the disclosure is set forth in the claims and not the above description, and is intended to include all modifications within the meaning and the scope equivalent to the claims.

What is claimed is:

1. A vehicle equipped with an autonomous driving system, the vehicle comprising:
   a vehicle platform configured to execute vehicle control in accordance with commands from the autonomous driving system, wherein
   the vehicle platform includes a base vehicle including an electric parking brake, and a vehicle control interface box configured to perform interfacing between the autonomous driving system and the base vehicle,
   an immobility command including one of a first value requesting immobilization of the vehicle, a second value requesting release of the immobilization of the vehicle, and a third value that makes no request, is transmitted from the autonomous driving system to the vehicle control interface box, and
   the vehicle platform is configured to release the electric parking brake when acceleration of the vehicle is requested, in a case where the immobility command including the third value is received and the electric parking brake is in an activated state.

2. The vehicle according to claim 1, wherein:
   in addition to the immobility command, an acceleration command requesting acceleration of the vehicle is further transmitted from the autonomous driving system to the vehicle control interface box; and
   the vehicle platform is configured to release the electric parking brake in response to receiving the acceleration command, in a case where the immobility command including the third value is received and the electric parking brake is in the activated state.

3. The vehicle according to claim 1, wherein the vehicle platform is configured to release the electric parking brake in response to accepting an acceleration operation, in a case where the immobility command including the third value is received and the electric parking brake is in the activated state.

4. The vehicle according to claim 1, wherein:
   the base vehicle further includes a parking lock device; and
   the vehicle platform is configured to,
   in response to receiving the immobility command including the first value, implement the immobilization of the vehicle by placing the electric parking brake and the parking lock device in an activated state respectively, and
   in response to receiving the immobility command including the second value when the immobilization of the vehicle is being implemented, release the activated state of the parking lock device.

5. A control method of a vehicle that is equipped with an autonomous driving system and that includes a vehicle platform configured to execute vehicle control in accordance with commands from the autonomous driving system, the vehicle platform including a base vehicle that includes an electric parking brake, and a vehicle control interface box configured to perform interfacing between the autonomous driving system and the base vehicle, the control method comprising:
   transmitting, from the autonomous driving system to the vehicle control interface box, an immobility command including one of a first value requesting immobilization of the vehicle, a second value requesting release of the immobilization of the vehicle, and a third value that makes no request; and
   releasing the electric parking brake when acceleration of the vehicle is requested, in a case where the immobility command including the third value is received and the electric parking brake is in an activated state.

6. A vehicle control interface box that is configured to perform interfacing between an autonomous driving system and a vehicle that is equipped with the autonomous driving system and that includes a vehicle platform configured to execute vehicle control in accordance with commands from the autonomous driving system, the vehicle platform including a base vehicle that includes an electric parking brake, wherein the vehicle control interface box is configured to
   receive, from the autonomous driving system, an immobility command including one of a first value requesting immobilization of the vehicle, a second value requesting release of the immobilization of the vehicle, and a third value that makes no request, and
   release the electric parking brake when acceleration of the vehicle is requested, in a case where the immobility command including the third value is received and the electric parking brake is in an activated state.

* * * * *